Jan. 5, 1943.　　　　P. FRANKO　　　　2,307,457
SHEAR
Filed June 10, 1942
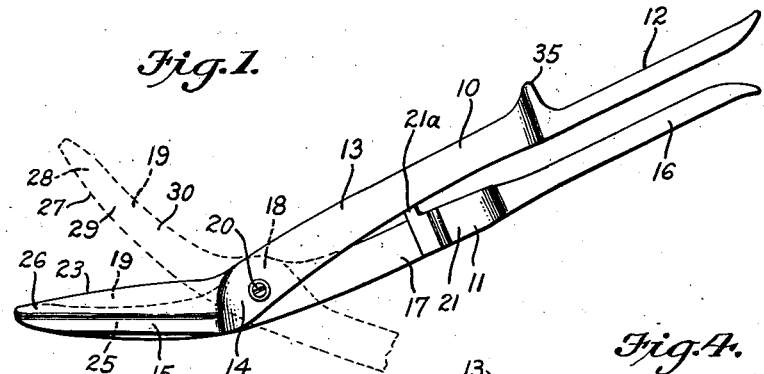
Inventor
Paul Franko,
By John H Hanrahan
Attorney Patented Jan. 5, 1943

2,307,457

UNITED STATES PATENT OFFICE 2,307,457

SHEAR

Paul Franko, Stratford, Conn.

Application June 10, 1942, Serial No. 446,459

5 Claims. (Cl. 30—257)

This invention relates to new and useful improvements in shears and has relation to a shear particularly adapted for the cutting of sheet metal stock and fabricated parts along curved lines although the shear of the invention may be used for cutting along straight lines.

An object of the invention is to provide a shear which is not unduly fatiguing to a user since it does not make too big a cut on a single operation and therefore does not require too much exertion on the part of the operator but makes a reasonably long cut so that an excessive number of cuts are not required per piece of material.

Another object is to provide a shear that makes a better edge, i. e., which leaves a smooth cut edge not likely to cut or tear the hands and which need not be treated with a file or the like in a finishing operation.

A further and very important object is to provide a shear with which the skilled operator can cut on practically any radius, whether large or very small, and yet obtain a smooth clean cut or edge, and not scratch the work at the sides of the cut.

The above objects and advantages all indicate a shear adapted for better and faster production, this being an important immediate need of aeroplane and other factories.

Other objects and advantages will become apparent from a consideration of the following detailed description taken in connection with the accompanying drawing wherein a satisfactory embodiment of the invention is shown. However, it is to be understood that the invention is not limited to the details shown but includes all such variations and modifications as fall within the spirit of the invention and the scope of the appended claims.

In the drawing:

Fig. 1 is a side elevational view showing a shear made in accordance with the invention;

Fig. 2 is a side elevational view looking toward the outer side of one member of the shear;

Fig. 3 is a top plan view of my improved shear;

Fig. 4 is a side elevational view looking at the inner side of one blade of the shear;

Fig. 5 is a similar view but of the other blade of the shear;

Fig. 6 is a transverse sectional view through the shear blades when closed, the view being taken as along the line 6—6 of Fig. 3;

Fig. 7 is a view looking into the front ends of the shear blades, with the shear closed; and Fig. 8 is a sectional view similar to Fig. 6 but with the shear blades open the view being taken where the cutting edges of the blades cross one another.

Referring in detail to the drawing the shear of the invention comprises a pair of members generally designated 10 and 11 respectively. The shears of the invention are made up in "rights" and "lefts" but as they are similar, in that the difference relates to the relationship of the blades, but one type of the shear is here shown. Member 10 comprises a handle 12, a shank 13, a hub 14 and a cutting blade 15 while member 11 is of corresponding construction and comprises a handle 16, a shank 17, a hub 18 and a cutting blade 19.

The members are arranged with their hubs 14 and 18 in side-by-side contacting relation and a pivot means 20 passes through said hubs and retains them in the described relation but for relative pivotal movements in parallel planes. Disposing the hubs as described locates the shanks 13 and 17, in their portions adjacent the hubs, in parallel, spaced, side-by-side relation as best shown in Fig. 3. However, shank 17 is laterally off-set toward its handle end as at 21 whereby the handle 16 of the upper blade 19 is disposed below or at the inner side of and in parallel relation with the handle 12.

This arrangement makes for ease in the operation or use of my shear since the operator may easily grasp both handles and does not need to spread his hand to grasp them since they are not laterally spaced. Thus the operator in closing his hand to operate the shear uses a straight motion, drawing the handle 16 toward the handle 12, and this is accomplished without undue strain and practically all effort expended is directed toward making a cut in the work at hand. A stop 21a on the shank 17 is in vertical alignment with the shank 13 and on closing movements of the handles is engaged by said shank 13 to limit movements of the handles toward one another and thus prevent any pinching of the user's hands between the handles.

In shaping the handle portions of members 10 and 11 handle 12 is made of greater width than depth and of less depth than the shank 13. This results in said handle presenting a relatively wide surface to the palm of the hand of the operator. An upwardly directed guard 35 at the juncture of handle 12 and shank 13 serves as a stop means to prevent casual slipping of the hand forward off the handle onto said shank.

The blades 15 and 19 each comprise an elongated body integral with the respective members 10 and 11 and from the rear end portions of the blades or from the hubs the shanks and handles of the members extend, at inclines, upwardly and rearwardly with respect to the blades as best shown in Fig. 1. With this construction when the lower cutting blade 15 is below or at the inner side of a piece of work the handles 12 and 16 are disposed above or outwardly of said work and so the user may work the shear of the invention without hitting his knuckles against the material being cut and without danger of cutting his hands on such material.

The blades 15 and 19 are each of particular and novel construction. Blade 15 has its cutting edge 23 at its upper inner corner and this edge is slightly bowed or curved longitudinally of the blade. From corner 23 the inner side 24 of blade 15 extends substantially straight downwardly to brace said corner and the lower side 25 of the blade then curves downwardly and outwardly to the outer side of the blade. The upper side 26 of blade 15 curves outwardly and downwardly from edge 23 to the outer side of the blade. Thus blade 15 is of considerable depth and is of substantially less width than depth and is so arranged that its greatest dimension is in a direction away from its cutting edge 23 and that such dimension is at an angle to the vertical. That is, the upper and lower surfaces of the blade 15 fall away rapidly from the cutting edge 23.

The upper and what is really the movable blade of the shear, that is the blade 19, when viewed in transverse section has a cutting edge 27 at its inner lower corner and from said corner the lower or bottom surface 28 of the blade is curved upwardly and outwardly to the outer side of the blade. The inner side or surface 29 of blade 19 extends upwardly a short distance in substantially a straight line to strengthen or brace the cutting edge 27 and then the top surface 30 of the blade curves upwardly and outwardly as shown best in Figs. 6 and 8. This blade 19 is therefore of greater width than depth but it is noted that from its cutting corner 27 it is quickly relieved by the outwardly and upwardly curved surface 30. Cutting edge 27 is also longitudinally curved as shown best in Fig. 5.

Each blade tapers or is reduced toward its free end and such ends are relatively small in area as suggested in Fig. 7. When a curved cut is being made the upwardly and outwardly curved surface 30 of blade 19 directs the metal at one edge of the cut while the downwardly and outwardly curved surface 25 of blade 15 directs the other edge portion of the cut metal. These surfaces tend to direct the portions of the metal at the edges of a cut upwardly and outwardly and downwardly and outwardly, respectively, as the shear is turned in making a curved cut and the action is smooth so that a neat and to all appearances continuous cut is made leaving no rough or jagged edges. The cut made with the present shear need not be in tiny or very small or short steps but a reasonable length of cut may be made with each closing of the shear and at the same time the shear may be turned when the cut is following a radius as the cut portions of the metal slide upwardly and outwardly and downwardly and outwardly on the surfaces 30 and 25, respectively.

In making a cut through work comprising a large sheet which may not be readily raised from a support or in any other connection where only a very shallow space is available at the rear or underside of the work the present shear is readily usable. In such an instance the shear is turned somewhat on its side so that the surface 26 of the lower blade 15 is almost parallel with the work. Then the cut is made. This is another advantage of the shaping of the blade so that while it is rigid and of substantial depth it may be used in the direction of its width and in such instances in a shallow space.

Having thus set forth the nature of my invention, what I claim is:

1. In a shear, a pair of members each comprising a handle, a shank, a hub and a cutting blade, said hubs arranged in side-by-side relation, a pivot passing through said hubs and retaining them in such relation but for relative pivotal movement in fixed planes, said shanks arranged in parallel side-by-side relation adjacent said hubs, the shank carrying the upper cutting blade having a lateral off-set whereby its handle is below and in the vertical plane of the handle of the other member, said handle of the other member of less depth and of greater width than the handle of the member carrying the upper blade, and a raised guard at the juncture of said handle and shank of the other member to prevent an operator's hand from slipping forward from said handle onto the shank.

2. In a shear, a pair of members including respectively upper and lower cutting blades, means pivoting said members together in the rear of said blades, said lower blade comprising an elongated body having a cutting edge at its upper inner corner, said lower blade on its inner side extending downwardly substantially straight for a short distance from said cutting edge and then extending downwardly and outwardly, said lower blade on its upper side extending downwardly and outwardly from said cutting edge with its lower edge located below the lower edge of said substantially straight inner side portion whereby substantially the entire body of the blade is disposed downwardly and laterally of said cutting edge and on turning of the shear somewhat onto its side the lower blade may be operatively disposed in a relatively shallow space beneath a piece of work, and said blade tapered toward its free end and longitudinally bowed in its portion having said cutting edge.

3. In a shear, a pair of members including respectively upper and lower cutting blades, means pivotally connecting said members in the rear of said blades, said upper cutting blade comprising an elongated body having a shearing edge at its inner lower corner, said body on its inner side extending upwardly substantially straight from said edge for a slight distance and then curving upwardly and outwardly to the outer side of the body and on its bottom side curving outwardly and upwardly from said shearing edge to the outer side of the body, said lower cutting blade comprising an elongated body having a shearing edge at its inner upper corner and on its upper side curving downwardly and outwardly from said edge to the outer side of the body and on its inner side extending downwardly substantially straight from said edge for a slight distance and then curving outwardly and downwardly to the outer side of the body.

4. The shear as in claim 3 wherein each of said blades is tapered toward its free end and is slightly bowed longitudinally in its portion having the cutting edge.

5. In a shear, a pair of members each comprising a handle, a shank, a hub and a cutting blade, said hubs located between the respective shanks and the cutting blades and in side-by-side relation, a pivot passing through and securing said hubs in such relation but for relative pivotal movements in parallel planes and with their blades comprising respectively upper and lower blades, said lower blade comprising an elongated body having a cutting edge at its upper inner corner, said lower blade on its inner side extending downwardly substantially straight for a short distance from said cutting edge and then extending downwardly and outwardly, said lower blade on its upper side extending downwardly and outwardly from said cutting edge whereby substantially the entire body of said blade is disposed downwardly and laterally of said cutting edge and on turning of the shear somewhat onto its side the lower blade may be operatively disposed in a relatively shallow space beneath a piece of work, said blade tapered toward its free end and longitudinally bowed in its portion having said cutting edge, said shanks and handles directed upwardly at an angle from said hubs disposing the shanks and handles in angular relation to the cutting blades whereby during use of the shear both said handles are outwardly of the plane of the outer face of the material being cut, said upper blade comprising an elongated body having a shearing edge at its inner lower corner, said body on its inner side extending upwardly substantially straight from said edge for a slight distance and then curving upwardly and outwardly to the outer side of the body, and said body on its bottom side extending upwardly and outwardly from said shearing edge to the outer side of the body.

PAUL FRANKO.